July 11, 1950    L. RUBERTINO ET AL    2,514,799
LUBRICATOR FOR VEHICLE FRONT WHEEL BEARINGS
Filed Nov. 6, 1947
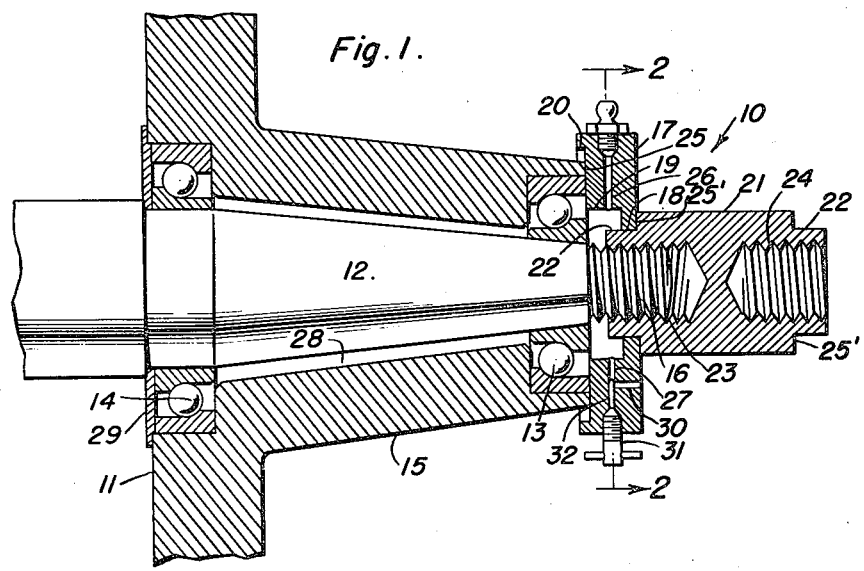
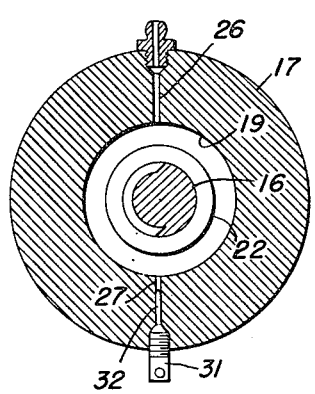
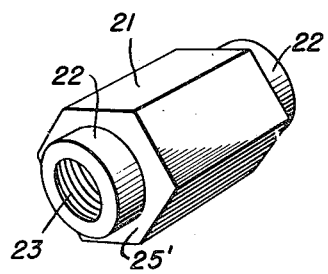
Louie Rubertino
Frank J. Novak
INVENTORS
BY *Thomas A. O'Brien*
*and Harvey B. Jackson*
Attorneys Patented July 11, 1950

2,514,799

UNITED STATES PATENT OFFICE 2,514,799

LUBRICATOR FOR VEHICLE FRONT WHEEL BEARINGS

Louie Rubertino, South Euclid, and Frank J. Novak, Cleveland, Ohio, assignors of one-third to Angie Rubertino, South Euclid, Ohio Application November 6, 1947, Serial No. 784,432

3 Claims. (Cl. 308—93)

This invention relates to new and useful improvements and structural refinements in lubricators, and the principal object of the invention is to provide a device of the character herein described, which may be attached to a front wheel spindle of automobiles and similar vehicles, so that lubricant may be supplied under pressure to the wheel bearings in the hub carried by the spindle.

The conventional method of lubricating these bearings generally involves the removal of the wheel from the hub and a subsequent removal of the hub from the spindle, whereupon grease is applied by hand to the bearings as well as to the spindle. This procedure not only requires a considerable amount of time and labor, but the result is not fully satisfactory, inasmuch as the thick lubricant employed cannot be properly applied to the bearing races, cage and rollers by mere hand pressure.

It is, therefore, a further object of the instant invention to eliminate these disadvantages by facilitating application of lubricant to the bearings without the necessity of removing the wheel and hub, and by applying such lubricant under extreme pressure so that it may enter the crevices and spaces between the bearing races, cage and rollers or balls, as the case may be.

Another object of the invention is to provide a lubricator which may be quickly and easily applied to and removed from the spindle assembly which is to be lubricated, and which may be readily operated or used even by unskilled persons.

An additional object of the invention is to provide a lubricator which is simple in construction, which will readily lend itself to economical manufacture, and which is otherwise well adapted for the purpose for which it is intended.

With the above more important objects in view, and such other objects as may become apparent as this specification proceeds, the invention consists essentially of the arrangement and construction of parts as illustrated in the accompanying drawings, in which:

Figure 1 is a cross sectional view of a front wheel spindle assembly, showing the invention in situ thereon;

Figure 2 is a cross sectional view, taken substantially in the plane of the line 2—2 in Figure 1; and Figure 3 is a perspective view of a retaining nut used in the invention.

Like characters of reference are employed to designate like parts in the specification and throughout the several views.

Referring now to the accompanying drawings in detail, the invention consists of a lubricator designated generally by the reference character 10, the same being adapted for use in association with a front wheel spindle assembly 11 which, as will be readily understood, includes the usual spindle 12 provided with a pair of bearings 13, 14 which, in turn, carry a rotatable wheel hub 15. The spindle 12 terminates in a screw-threaded shank 16 adapted to receive a nut (not shown) whereby the hub is retained in position on the spindle.

The lubricator 10 embodies in its construction a disk-like member or shield 17 provided on one side with a central bore 18 and on its relatively opposite side with a relatively small counterbore or chamber 19 and a relatively large counterbore 20, as is best shown in Figure 1.

The shield 17 is removably retained in position on the spindle 12 in abutting relation with the hub 15, this being accomplished by providing a polygonal retaining nut 21. The end portions of this nut terminate in adapters 22 and the ends are formed with concentric, screw-threaded bores 23, 24, one of which is left-handed, while the other is right-handed.

The nut 21 is applied to the spindle 12 by simply screw-threading the shank 16 into one of the bores (23, 24) of the nut, while one of the adapters 22 extends into the bore 18 of the shield and the counterbored portion 20 of the shield is pressed against the marginal edge 25 of the hub 15 by one of two shoulders 25' provided on the nut 21.

The counterbore 20 is, of course, of sufficient size to accommodate wheel hubs of various types and diameters, and it should be explained that the purpose of the left and right-handed bores 23, 24 is to facilitate the use of the nuts on spindle shanks having either left-handed or right-handed screw threads.

The disk 17 is formed with a pair of diametrically opposed passages 26, 27, these communicating at their inner ends with the counterbore 19. The passage 26 is a lubricant passage and the outer end thereof is provided with a so-called "Zerk" grease fitting or nipple, to which lubricants may be supplied under extreme pressure in any desired manner. The lubricant thus supplied will find its way into the counterbore 19 through the passage 26 and thence to the interior of the bearing 13. Thereafter, as the lubricant continues to be supplied, it will find its way along an annular recess 28 which usually exists between the spindle 12 and the hub 15, and to the inner bearing 14.

This bearing is generally provided with an oil seal 29, so that the escape of lubricant through the bearing 14 is prevented.

While the lubricating operation is in progress, air is permitted to escape from the interior of the spindle assembly through the aforementioned passage 27 and through a further air passage 30 which merges into the passage 27 and communicates with the atmosphere.

A valve screw 31, equipped with a needle 32, is provided in the shield 17, the purpose of this arrangement being to facilitate the shutoff of the passage 27 to prevent the escape of grease after all air has been forced out of the interior of the spindle assembly.

It will be apparent from the foregoing that the lubrication of the spindle assembly may be effected without removing the wheel and the hub from the spindle, and the advantages of the invention are thus readily appreciated.

Having described the invention, what is claimed as new is:

1. The combination of a spindle provided at one end thereof with a screw-threaded shank, a hub rotatable on said spindle and having a bearing receiving recess, a bearing provided on said spindle and seated in said recess, and a lubricator comprising a disc-shaped member positioned on said shank and having its inner face in abutment with said hub, a keeper nut provided on said shank in abutment with the outer face of said member for clamping the latter against the hub, the inner face of said member being provided with a central lubricant chamber communicating with said recess, said member being formed with a radial bore extending from said chamber to the peripheral portion of the member, and a grease fitting provided on said member in the outer end of said bore, whereby lubricant may be introduced through the bore into said chamber and said recess.

2. The device as defined in claim 1 wherein said member is provided with a central opening communicating with said recess, said nut including a main body portion, a cylindrical adapter at least at one end of said body portion, and an annular shoulder between said body portion and said adapter, said adapter engaging said shank and extending into said opening, and said shoulder abutting the outer face of said member.

3. The device as defined in claim 1 wherein said member is provided with an air outlet passage extending from said chamber to the peripheral portion of the member and communicating with the atmosphere, and a shut-off valve provided in said passage.

LOUIE RUBERTINO.
FRANK J. NOVAK.

REFERENCES CITED

The following references are of record in the file of this patent:

UNITED STATES PATENTS

| Number | Name | Date |
|---|---|---|
| 1,171,693 | Berkey | Feb. 15, 1916 |
| 1,660,728 | Stokes | Feb. 28, 1928 |